(No Model.) 4 Sheets—Sheet 3.

F. T. LOMONT, Dec'd.
M. P. LOMONT, Administratrix.
ROAD SCRAPER.

No. 410,249. Patented Sept. 3, 1889.

Witnesses
M. C. Fowler
J. W. Garner

Mrs. Mary P. Lomont
Administratrix
of the estate of
By her Attorneys Francis T. Lomont
Inventor Deceased (No Model.)  4 Sheets—Sheet 4.
F. T. LOMONT, Dec'd.
M. P. LOMONT, Administratrix.
ROAD SCRAPER.
No. 410,249.  Patented Sept. 3, 1889.
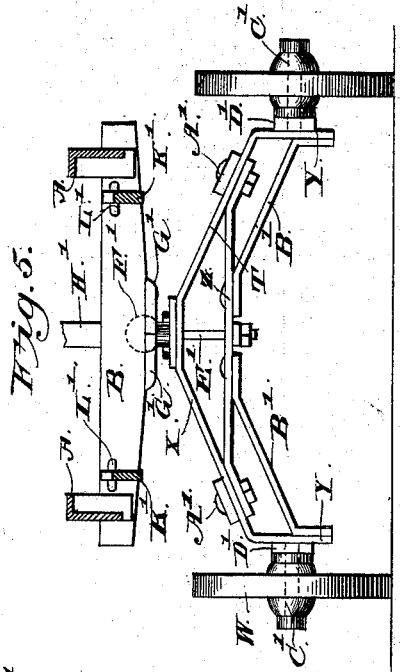
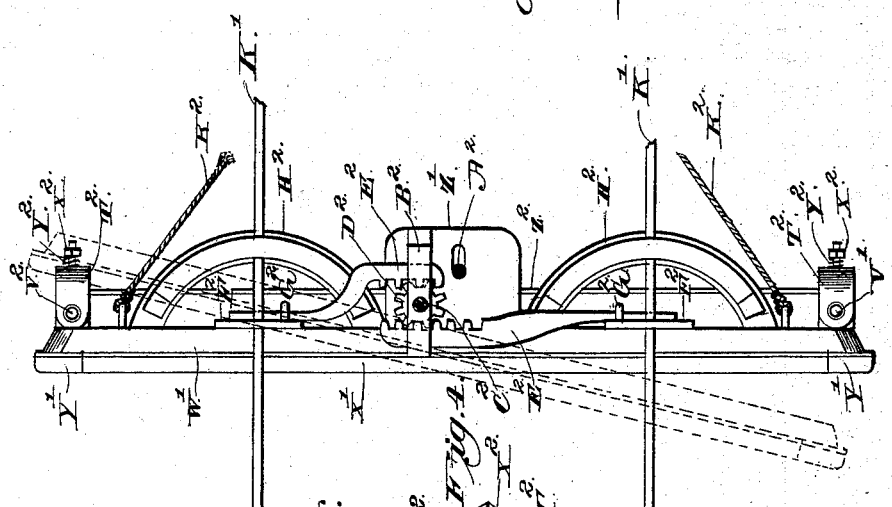
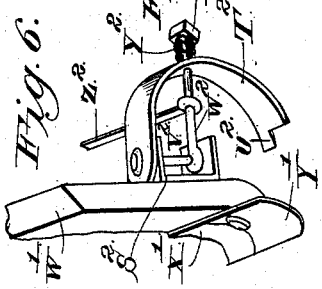
Witnesses
Mrs Mary P. Lomont
Administratrix
of the estate of
By her Attorneys Francis T. Lomont
Inventor, Deceased

United States Patent Office.

MARY P. LOMONT, OF FORT WAYNE, INDIANA, ADMINISTRATRIX OF FRANCIS T. LOMONT, DECEASED.

ROAD-SCRAPER.

SPECIFICATION forming part of Letters Patent No. 410,249, dated September 3, 1889.

Application filed January 31, 1889. Serial No. 298,202. (No model.)

*To all whom it may concern:*

Be it known that I, MARY P. LOMONT, a citizen of the United States, residing at Fort Wayne, in the county of Allen and State of Indiana, administratrix of the estate of FRANCIS T. LOMONT, late a citizen of the United States, residing at Fort Wayne, in the county of Allen and State of Indiana, deceased, (as by reference to the duly-certified copy of letters of administration, hereto annexed, will more fully appear,) do hereby declare that FRANCIS T. LOMONT invented a new and useful Improvement in Road-Scrapers, of which the following is a specification.

The invention relates to an improvement in road-scrapers; and it consists in the peculiar construction and novel combination of devices that will be more fully set forth hereinafter, and particularly pointed out in the claims.

Figure 1:
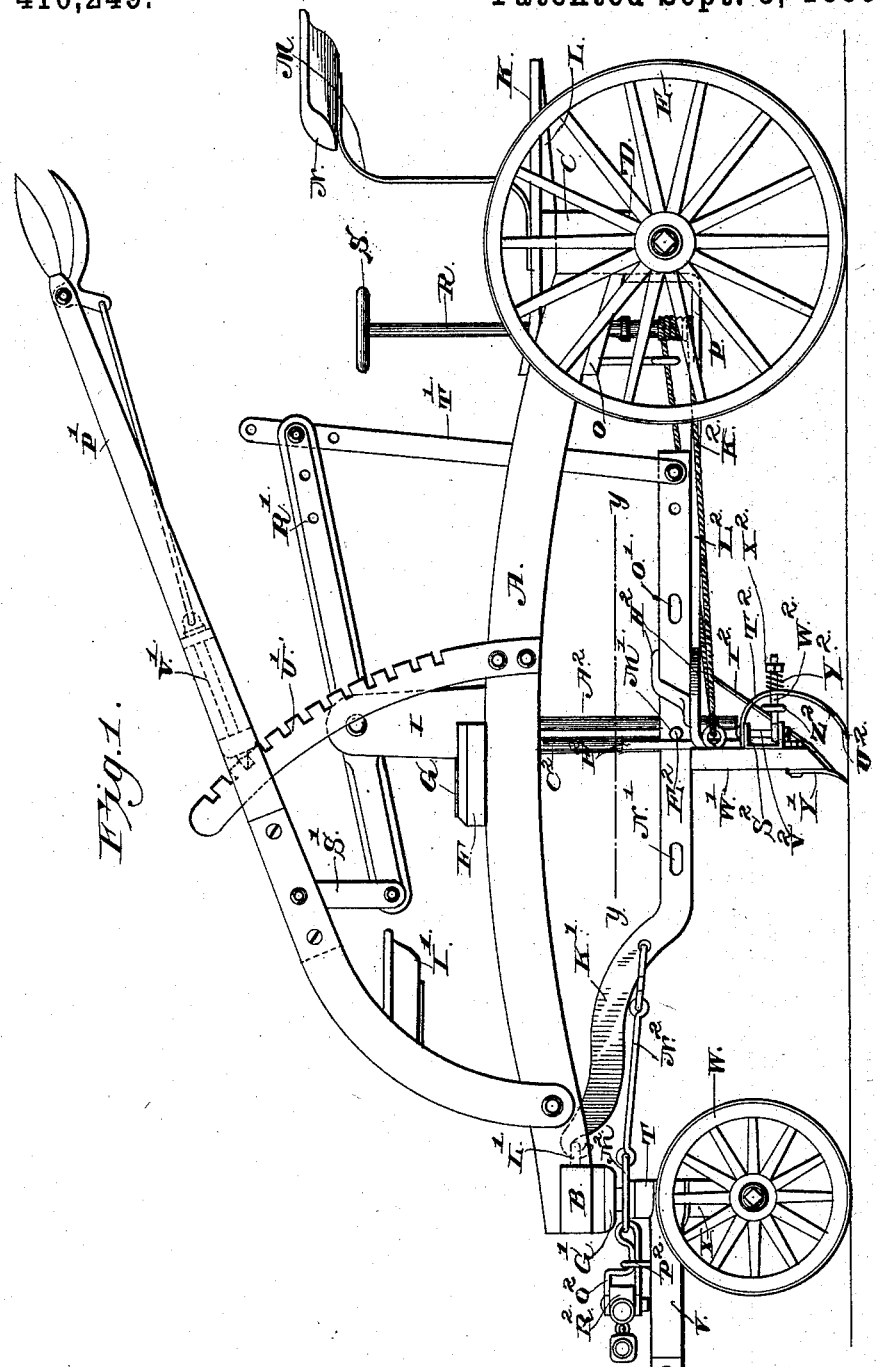
Figure 2:
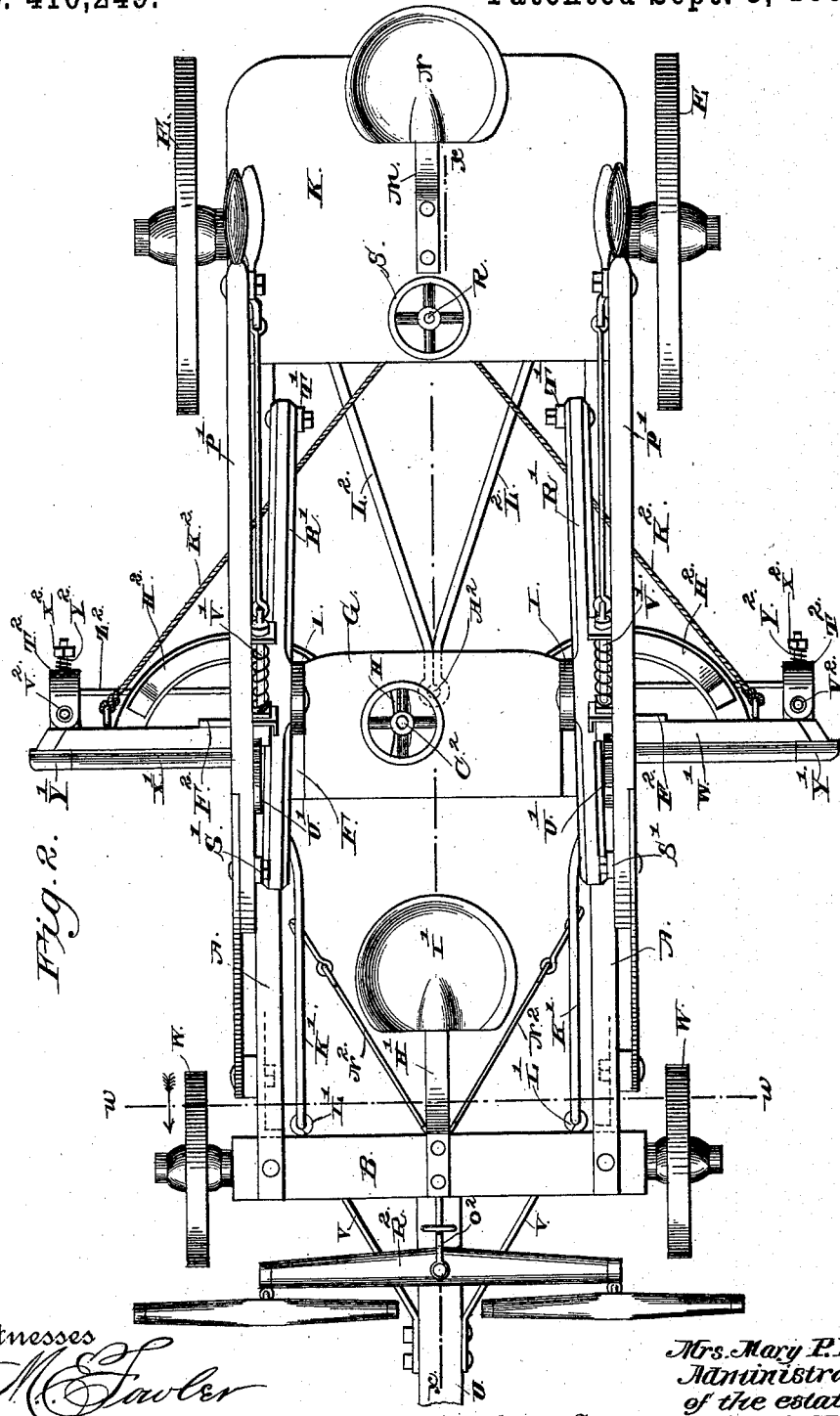
Figure 3:
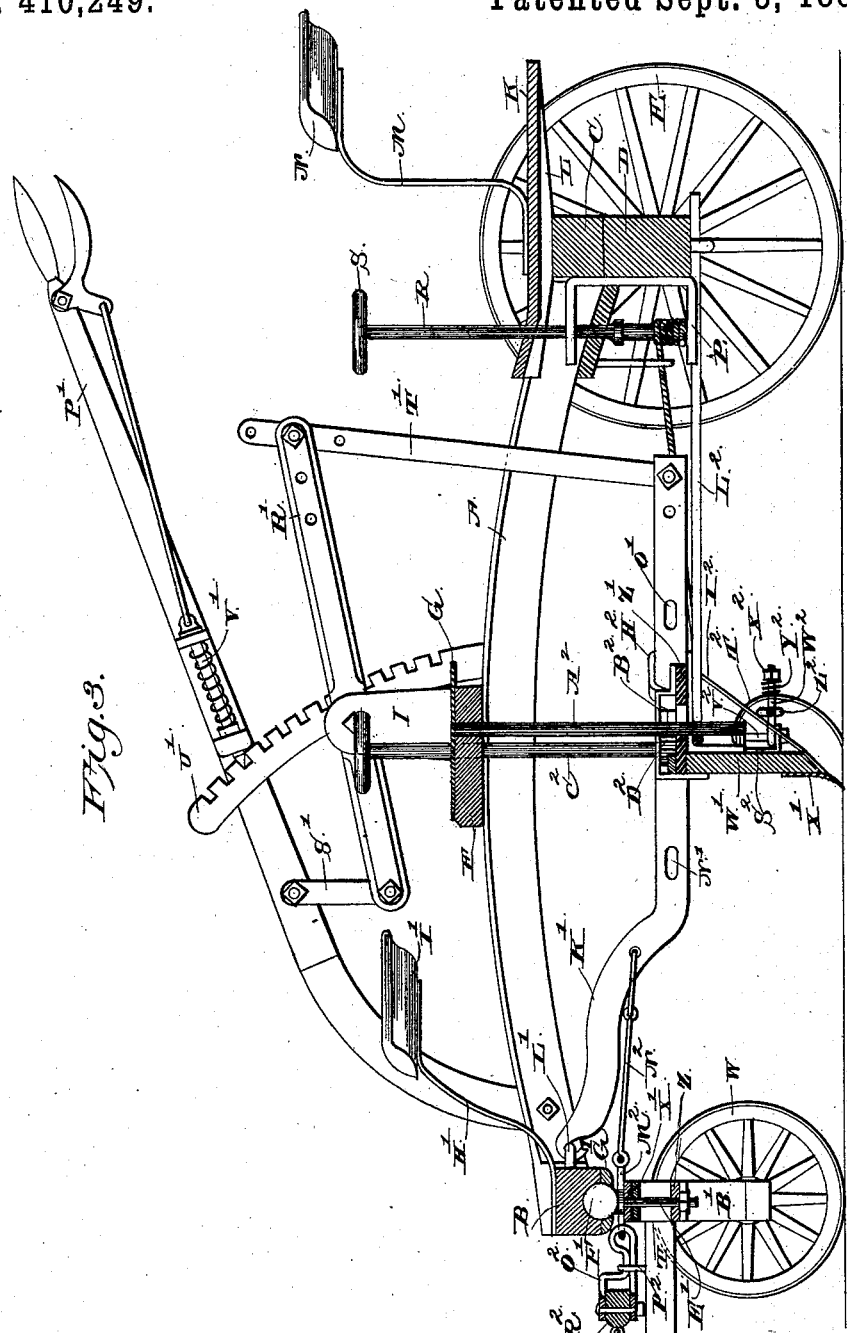

In the accompanying drawings, Figure 1 is an elevation of a road-scraper embodying the improvement. Fig. 2 is a top plan view of the same. Fig. 3 is a longitudinal sectional view taken on the line $x\,x$ of Fig. 2. Fig. 4 is a horizontal sectional view taken on the line $y\,y$ of Fig. 1. Fig. 5 is a transverse sectional view taken on the line $w\,w$ of Fig. 2. Fig. 6 is a detail view, in perspective, of one of the snow-plow attachments to the scraper.

The main frame of the machine comprises a pair of longitudinally-arched bars A, preferably made of angle-iron, connected together at their front ends by a cross-bar B, and connected together at their rear ends by a cross-bar C. The latter is bolted or otherwise secured on the rear axle D, having wheels E.

F represents a transverse board, which connects the centers of the beams A and is secured thereto. On the said board is bolted a metallic plate G, having a central slot or opening H, and secured to and rising from a central portion of the beams A are standards I.

K represents a platform, which is supported on the rear ends of the beams A and on longitudinal bars L, that are secured to the beams C. On the said platform is supported a seat-bar M, to the upper end of which is secured a seat N.

O represents a board, which is secured to the under side of the beams A and is arranged on the front side of the beam C. On the front side of said beam and on the front side of the rear axle, at the central portions thereof, is secured a U-shaped bearing-yoke P, in which is journaled a drum-shaft R, the upper end of which extends through an opening in the platform K, and is provided with a hand-wheel S, by means of which the said drum-shaft may be rotated in either direction.

The front truck comprises the trussed axle T, the tongue U, the braces V, which connect the tongue to the trussed axle, and the wheels W, journaled on the said axle. The front axle is composed of an arched metallic bar X, having its ends bent downward to form vertical arms Y, a bar Z, arranged under the bar X and having its ends secured thereto by the same bolts A' which are employed to secure the rear ends of the braces V to the axle, and a pair of brace-bars B', bent at the angles shown and having their ends bolted to the under side of the bar Z and to the inner side of the arms Y, at the lower ends thereof. The spindles C' are secured to and project from the arms Y, blocks D' being arranged on said spindles and interposed between the wheels and the arms Y. The king-bolt E', which passes through the center of the front axle, is secured at its upper end in a ball F', swiveled in a socket formed in the under side of the cross-bar B, and in a block G', secured to the under side of and at the center of the same.

From the foregoing description it will be understood that the front axle is given a universal movement at the front end of the main frame.

H' represents a spring seat-bar, having its lower end secured on the center of the beam B and provided at its upper end with a seat I' for the driver.

The draft-bars K' have their front ends arched and provided with hooks which engage rings or keepers L' on the rear side of beam B, at the ends thereof. The rearward-extending portion of each draft-rod is straight and is provided with a transverse opening M' and a longitudinal opening N' and O' at suitable distances from and on opposite sides of the opening M'.

P' represents a pair of hand-levers, which have their front ends curved downward and pivotally connected to the beams A at the front of the machine, the length of the hand-levers being such that the rear ends thereof are within easy reach of a person in the seat N at the rear of the machine.

Levers R' are fulcrumed in the upper ends of the standards I, have their front ends connected to the hand-levers P' by links S', and have their rear ends connected to the rear ends of the draft-bars K' by means of link-rods T', the latter having adjusting-openings at their upper ends adapted to register with similar adjusting-openings in the rear ends of levers R', whereby the distance between the rear ends of said levers and the rear ends of the draft-bars may be regulated at will.

The curved rack-bars U' are secured to and extend upward from the beams A, and are engaged by the usual spring-actuated locking-bolts V' on the hand-levers, whereby the latter may be locked to the rack-bars at any desired inclination. It will be understood that by depressing the rear ends of the levers P' the levers R' and links S' and T' will cause the rear ends of the draft-rod to be elevated. Inasmuch as the said levers and draft-bars are entirely disconnected from each other each lever with its companion draft-bar may be operated independently of the other.

The scraper comprises the board W' and a scraping-blade X', secured to the lower side thereof and having its lower edge curved forward, as shown. The length of the scraping-blade is somewhat less than the length of the board, and at the lower corners of the latter are secured removable scraping-blades Y', which are adapted to be replaced by new ones when they become worn. On the upper edge of the board W', at the center of the same, is secured a rearward-extending plate Z'. A vertical guide-rod $A^2$ depends from the plate G and extends through an opening in the plate Z'.

$B^2$ represents a yoke or keeper on the upper side of the plate Z'. In the plate Z' and in the said keeper or yoke is journaled the lower end of a shaft $C^2$, which extends through the opening H in plate G, and has a crank-arm or hand-wheel at its upper end by which it may be rotated. Keyed to the lower end of said shaft is a pinion $D^2$, that engages a pair of rack-arms $E^2$, the latter being arranged on opposite sides of the pinion and guided between the latter and the keeper $B^2$.

On the rear side of the board W', at a suitable distance from the ends thereof, are bolted vertical plates or ears $F^2$, the upper ends of which project above the upper edge of the board and are provided with openings through which the draft-rods pass, whereby the scraper is adapted to turn on the shaft $C^2$ as a pivot and cause its ends to be shifted back or forth on the draft-rods. Each plate $F^2$ has on its rear side a guide $G^2$ for the outer end of the rack-bars $E^2$, the said outer ends of the rack-bars forming keys or pins adapted to engage the openings M' N' O' of the draft-rod; also secured on the rear side of the board W' and arranged concentrically with the plates $F^2$ are curved ways or brackets $H^2$, having segmental openings through which the draft-bars extend, the said curved brackets or ways thereby serving to maintain the scraper at exactly right angles to the draft-bars. Said ways or brackets have their rear sides strengthened and supported by braces $I^2$, the lower ends of which are bolted on the rear side of the scraper-board.

When the rack pins or keys are engaged with the openings M', the scraper is secured in a transverse position under the frame of the machine and at exactly right angles to the line of draft. By turning the shaft $C^2$ its pinion will be caused to operate the rack keys or pins and withdraw them from the openings M. Ropes or chains $K^2$ are attached to the ends of the scraper and are coiled in opposite directions on the drum-shaft R, and when the keys or pins are out of engagement with the openings in the draft-rods, as before stated, the scraper may be turned on the pivot-shaft $C^2$ to an oblique direction, as indicated in dotted lines in Fig. 4, by turning the drum-shaft R and causing it to coil up one of the ropes or chins and simultaneously uncoil the other, as will be readily understood. By engaging the keys or pins with the openings N' O' of the draft-bars the scraper may be secured when adjusted to an oblique position.

$L^2$ represents a pair of hounds, which have their rear ends bolted or otherwise secured under the rear axle. A ring or eye is formed at the front end of the said hounds and engages the lower end of the depending pivot-shaft $A^2$, the function of the said hounds being to brace the said shaft and render it capable of withstanding strain.

Inasmuch as the draft-bars are connected near opposite ends of the scraper the latter may be raised and lowered throughout its entire length by raising or lowering the rear ends of the hand-levers simultaneously, and by means of the said levers either end of the scraper may be elevated and the opposite end thereof depressed, the scraper being thus adapted to be supported at any desired inclination to give the requisite crown to the road.

$M^2$ represents an opening or link through which the king-bolt extends, and which is supported on the upper side of the front axle and adapted to play back and forth on the king-bolt. Link rods or chains $N^2$ connect the said ring or link to the draft-rods, and secured to the front side of said ring or link is a hammer-strap O², which plays longitudinally in a guide P² on the rear end of the tongue, and to the said hammer-strap is pivotally connected the whiffletree R².

From the foregoing description and by reference to the drawings it will be obvious that the draft is transferred directly from the whiffletree to the scraper, and consequently the machine-frame is relieved of unnecessary strain.

I will now describe attachments to the road-scraping machine, by means of which the same is adapted to be used also as a snow-plow for clearing the tracks of street and electric railways. On the rear side of the scraper, near the ends of the same, are secured bracket-yokes S².

T² represents curved snow-shovels, which are provided at their lower ends at their inner corners with projecting points U², adapted to engage the inner sides of the tracks, while the lower edges of the plows or shovels bear directly upon the treads of the track-rails. The upper ends of the said plows or shovels are pivoted to vertical bolts V², which are mounted in openings in brackets S², the said plows or shovels being adapted to swing longitudinally from said pivotal bolts.

W² represents adjusting-bolts, which have eyes at their front ends engaging the pivotal bolt, and have their rear ends passed through openings in the plows or shovels. Coiled extensile springs encircle the projecting rear ends of the eyebolts, and adjusting-nuts X² are screwed to said bolts and bear against the rear ends of the springs Y² and serve to force them against the rear sides of the plows or shovels. A sufficient degree of elasticity is thus imparted to the plows or shovels to enable the latter to clear slight obstructions on the track-rails and prevent them from breaking when used.

Z² represents a transverse rod arranged in rear of the scraper and having eyes at its ends engaging the bolts W², the function of the said rod being to permit the plows or shovels to sway rapidly in unison.

Having thus described the invention, what is claimed is—

1. The combination, in a road-scraper, of the draft-bars, the scraper having the plates or ears connected to and adapted to slide on the draft-bars, and the rearward-extending brackets or guides secured to the scraper and engaging the draft-bars, substantially as described.

2. The combination, in a road-scraper, of the draft-bars, the pivoted scraper, the racks guided on the scraper and having the pins or keys adapted to engage openings in the draft-bars, and the gear to operate the said rods, substantially as described.

3. The combination, in a road-scraper, of the draft-bars, the scraper connected thereto and adapted to oscillate thereon, the levers R', connected to the draft-bars, the hand-levers, and the links connecting the same to the levers R', substantially as described.

4. In a road-scraper, the combination of the main frame having the depending pivot-shaft A², the scraper pivotally connected to the said shaft and adapted to move vertically thereon, the draft-bars connected to the scraper and forming guides and supports for the same, and the levers connected to the draft-bars and adapted to raise and lower them, substantially as described.

5. The combination, in a road-scraper, of the main frame having the depending pivotal shaft, the scraper pivoted thereon, the draft-bars connected to and forming the guides and supports for the scraper, the levers to raise and lower the draft-bars, the shaft journaled in bearings on the scraper and having the pinion and the racks engaging said pinion, and having the keys or pins to engage openings in the draft-bars, for the purpose set forth, and means, substantially as described, to adjust the scraper, substantially as set forth.

6. The combination, in a road-scraper, of the main frame having the depending central pivotal shaft, the draft-bars, the scraper pivoted on the depending shaft and connected to the draft-bars, and the hounds or braces connecting the lower ends of the pivotal shaft to the rear truck, for the purpose set forth, substantially as described.

7. In a road-scraper, the combination, with the scraper having the ears or brackets on its rear side, of the pivotal bolts in said ears or brackets, the plows or shovels loosely connected to the upper ends of said pivotal bolts, the springs bearing on the plows or shovels, and the transverse rods connecting the same, for the purpose set forth, substantially as described.

8. The combination, with the scraper having the ears or brackets on its rear side, of the pivotal bolts in said ears or brackets, the plows or shovels loosely connected to the upper ends of said pivotal bolts, the eyebolts engaging the pivotal bolts and extending rearward to the plows or shovels, the adjusting-nuts on said eyebolts, and the springs bearing against the adjusting-nuts and against the plows or shovels, substantially as described.

9. The combination, with the scraper, of the plows or shovels flexibly connected thereto and having the extended points at their inner lower corners, for the purpose set forth, substantially as described.

10. In a road-scraper, the combination, with the frame and its truck, the latter provided with a tongue, of the scraper-bar suspended loosely by the frame, a hammer-strap mounted on the draft-bar and connected to the whiffletree, and links for connecting the hammer-strap directly to the scraper-bar in rear of its connection with the frame, substantially as specified.

11. In a road-scraper, the combination, with a main scraper-blade, of detachable scraping-blades arranged in rear thereof, and means for adjusting the same to and from the main blade, substantially as specified.

In testimony that I claim the foregoing as the invention of FRANCIS T. LOMONT I have hereto affixed my signature in presence of two witnesses.

MARY P. LOMONT,
*Administratrix of the estate of Francis T. Lomont, deceased.*

Witnesses:
F. WILKINSON,
WILLIAM MILLER.